United States Patent
Liang et al.

(10) Patent No.: US 7,480,412 B2
(45) Date of Patent: Jan. 20, 2009

(54) TOBOGGAN-BASED SHAPE CHARACTERIZATION

(75) Inventors: Jianming Liang, Paoli, PA (US); Luca Bogoni, Philadelphia, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 701 days.

(21) Appl. No.: 11/006,282

(22) Filed: Dec. 7, 2004

(65) Prior Publication Data

US 2005/0141765 A1 Jun. 30, 2005

Related U.S. Application Data (60) Provisional application No. 60/530,069, filed on Dec. 16, 2003.

(51) Int. Cl.
*G06K 9/46* (2006.01)

(52) U.S. Cl. .................. 382/190; 382/195; 382/199; 382/203; 382/225

(58) Field of Classification Search ............ 382/181, 382/173, 165, 225, 154, 180, 195, 128, 190, 382/203, 199; 345/419, 581, 606, 421–424, 345/582–586, 619, 642, 441
See application file for complete search history.

(56) References Cited

U.S. PATENT DOCUMENTS

| | | | | |
|---|---|---|---|---|
| 5,889,881 | A * | 3/1999 | MacAulay et al. ......... | 382/133 |
| 6,169,817 | B1 * | 1/2001 | Parker et al. .............. | 382/131 |
| 6,272,233 | B1 * | 8/2001 | Takeo ...................... | 382/128 |
| 6,418,238 | B1 * | 7/2002 | Shiratani et al. .......... | 382/133 |
| 6,514,082 | B2 | 2/2003 | Kaufman et al. | |
| 6,947,784 | B2 * | 9/2005 | Zalis ....................... | 600/425 |
| 7,127,100 | B2 * | 10/2006 | Wenzel et al. ............. | 382/154 |
| 7,272,251 | B2 * | 9/2007 | Acar et al. ................ | 382/128 |
| 2002/0164060 | A1 | 11/2002 | Paik et al. | |
| 2002/0164061 | A1 | 11/2002 | Paik et al. | |
| 2003/0223627 | A1 * | 12/2003 | Yoshida et al. ............ | 382/128 |
| 2004/0109592 | A1 * | 6/2004 | Bankman et al. .......... | 382/128 |
| 2005/0036691 | A1 * | 2/2005 | Cathier .................... | 382/203 |
| 2005/0185838 | A1 * | 8/2005 | Bogoni et al. ............. | 382/165 |
| 2005/0271276 | A1 * | 12/2005 | Liang et al. ............... | 382/180 |
| 2005/0271278 | A1 * | 12/2005 | Liang et al. ............... | 382/195 |

(Continued)

FOREIGN PATENT DOCUMENTS

CA 2591241 A1 * 7/2006

(Continued)

OTHER PUBLICATIONS

Mortensen, E.N.; Barrett, W.A.; Toboggan-based intelligent scissors with a four-parameter edge model. Computer Vision and Pattern Recognition, 1999. IEEE Computer Society Conference on. Jun. 23-25, 1999 vol. 2, pp. 452-458.*

(Continued)

*Primary Examiner*—Brian Q Le
*Assistant Examiner*—Julian D Brooks (57) ABSTRACT

A method and apparatus for characterizing an image. The method selects one or more toboggan potentials from the image, or a portion thereof, to be tobogganed. It toboggans the selected toboggan potentials to generate one or more toboggan parameters, forming at least one toboggan cluster using one or more of the toboggan parameters. It also selects one or more of the toboggan clusters to compute at least one feature parameter to characterize the image or a portion thereof.

28 Claims, 12 Drawing Sheets

U.S. PATENT DOCUMENTS

2006/0018549 A1* 1/2006 Liang et al. .................. 382/190
2006/0209063 A1* 9/2006 Liang et al. .................. 345/419
2007/0036406 A1* 2/2007 Bogoni et al. ............... 382/128

FOREIGN PATENT DOCUMENTS

WO WO0104842 A1 * 1/2001
WO WO2007021714 A3 * 1/2007

OTHER PUBLICATIONS

Sweeney, N.; Sweeney, B.V.; Efficient segmentation of cellular images using gradient-based methods and simple morphological filters. Engineering in Medicine and Biology society, 1997. Proceedings of the 19th Annual International Conference of the IEEE Oct. 30-Nov. 2, 1997 vol. 2, pp. 880-882.*

Fowlkes, C.; Martin, D.; Malik, J.; Learning affinity functions for image segmentation: combining patch-based and gradient-based approaches. Computer Vision and Pattern Recognition, 2003. Proceedings. 2003 IEEE Computer Society Conference on Jun. 18-20, 2003, vol. 2, pp. II-54-61.*

Barrett W A et al: "Intelligent segmentation tool s" Biomedical Imaging, 2002. Proceedings. 2002 IEEE International Symposium on Jul. 7-10, 2002, Piscataway, NJ, USA,IEEE, Jul. 7, 2002, pp. 217-220, XP010600563 ISBN: 0-7803-7584-X abstract, sections 2.1,2.2,2.3, Figs. 1-3.

Dang T et al: "An image segmentation technique based on edge-preserving smoothing filter and anisotropic diffusion" Image Analysis and Interpretation, 1994., Proceedings of the IEEE Southwest Symposium on Dallas, TX, USA Apr. 21-24, 1994, Los Alamitos, CA, USA,IEEE Comput. Soc, Apr. 21, 1994, pp. 65-69, XP010099712 ISBN: 0-8186-6250-6 abstract, section 2.2, Figs. 1-10.

Umbaugh S E et al: "Feature Extraction in Image Analysis. A Program for Facilitating Data Reduction in Medical Image Classification" IEEE Engineering in Medicine and Biology Magazine, IEEE Inc. New York, US, vol. 16, No. 4, Jul. 1997 (1997-071, pp. 62-73, XP000656548 ISSN: 0739-5175 Figs. 3-7, section "Binary Object Features".

Fairfield J Ed—Institute of Electrical and Electronics Engineers: "Toboggan Contrast Enhancement for Contrast Segmentation" Proceedings of the International Conference on Pattern Recognition. Atlantic City, Jun. 16-21, 1990. Conference A: Computer Vision and Conference B: Pattern Recognition Systems and Applications, Los Alamitos, IEEE Comp. Soc. Press, US, vol. vol. 1 Conf. 10, Jun. 16, 1990, pp. 712-716, XP000166418 ISBN: 0-8186-2062-5 whole document.

Database Compendex 'Online! Engineering Information, Inc., New York, NY, US; Nov. 11, 1991, Yao Xu et al: "Fast image segmentation by sliding in the derivative terrain" XP009045370 Database accession No. EIX92061249662 Abstract.

-& Proc SPIE Int Soc Opt Eng; Proceedings of SPIE—The International Society for Optical Engineering 1992 Publ by Int Soc for Optical Engineering, Bellingham, WA, USA, vol. 1607, Nov. 11, 1991, pp. 369-379, XP009045370 whole document.

R.M. Summers, et al., Automated Polyp Detector for CT Colonography: Feasibility Study. Radiology 216 (1) 284-90, (2000).

R.M. Summers, et al., Automated Polyp Detection at CT Colonography: Feasibility Assessment in a Human Population. Radiology 219:51-59 (2001).

R.M. Summers, Challenges for Computer-Aided Diagnosis for CT Colonography. (Invited review article) Abdom Imaging, 27:268-274 (2002).

R. M. Summers, et al., Colonic Polyps: Complementary Role of Computer-Aided Detection on CT Colongraphy. Radiology, 225(2):391-399.

A.K. Jerebko, et al., Polyp Segmentation Method for CT Colonography Computer Aided Detection, SPIE MI 2003.

A.K. Jerebko, et al., Multi Network Classification Scheme for Detection of Colonic Polyps in CT Colongraphy Data Sets, SPIE Medical Imaging: Physiology and Function from multidimensional images, 2002, pp. 207-212.

S. B. Gokturk, et al., A Statistical 3-D Pattern Processing Method for Computer-Aided Detection of Polyps in CT Colonography. IEEE Transaction on Medical Imaging 20(12): 1461-7, 2002.

B. Acar, et al., Edge Displacement Field-Based Classification for Improved Detection of Polyps in CT Colonography. IEEE Transaction on Medical Imaging. 21(12): 1461-7, 2002.

R.M. Summers, et al., Future Directions of CT Colonography: Computer Aided Diagnosis. In Atlas of Virtual Colonoscopy, A. Dachman (ed.) Springer-Verlag, (in print) 2002.

H. Yoshida, et al., Three-Dimensional Computer-Aided Diagnosis Scheme for Detection of Colonic Polyps. IEEE Transaction on Medical Imaging 20: 1261-1274, 2001.

J. Nappi, et al., Distance-Based Feature for Reduction of False Positives in Computer-Aided Detection of Polyps in CT Colongraphy (abstract), RSNA' 03.

H. Yoshida, et al. , Computerized Detection of Colonic Polyps at CT Colonography on the Basis of Volumetric Features: pilot study. Radiology 222:327-336, 2002.

H. Yoshida et al., Computer-Aided Diagnosis Scheme for the Detection of Polyps With CT Colonography. RadioGraphics, 2002.

J. Nappi, et al., Automated Detection of Polyps in CT Colonography: Evaluation of Volumetric Features for Reduction of False Positives. Acad Radiol 9:386-397, 2002.

J. Nappi, et al., Effect of Knowledge-Guided Colon Segmentation in Automated Detection of Polyps in CT Colonography. Proc SPIE 4683 (in print), 2002.

G. Kiss, et al., Computer-Aided Diagnosis in Virtual Colonography via Combination of Surface Normal and Sphere Fitting Methods, European Radiology, vol. 12, No. 1, pp. 77-81, Jan. 2002.

G. Kiss, et al., Computer-Aided Detection of Colonic Polyps via Geometric Features Classification, Proceedings 7th International Workshop on Vision, Modeling and Visualization, pp. 27-34, Nov. 20-22, Erlangen, Germany.

J. Fairfield, et al., Toboggan Contrast Enhancement for Contrast Segmentation, in IEEE Proc., of the 10th International Conference on Pattern Recognition (ICPR'90), vol. 1, pp. 712-716, Atlantic City, NJ, Jun. 1990.

X. Yao, et al., Fast Image Segmentation by Sliding in the Derivative Terrain, in SPIE Proc. of Intelligent Robots and Computer Vision X: Algorithms and Techniques, vol. 1607, pp. 369-379, Nov. 1991.

E.N. Mortensen, et al. Toboggan-Based Intelligent Scissors With a Four Parameters Edge Model, in IEEE Proc. of Computer Vision and Pattern Recognition (CVPR'99), vol. II, pp. 452-458, Fort Collins, CO., Jun. 1999.

* cited by examiner

TOBOGGAN-BASED SHAPE CHARACTERIZATION

CROSS-REFERENCE TO RELATED APPLICATIONS

This application claims the benefit of U.S. Provisional Application Ser. No. 60/530,069, filed on 16 Dec. 2003 and entitled "Toboggan-Based Shape Characterization", which is incorporated herein by reference in its entirety.

BACKGROUND OF INVENTION

1. Technical Field

The present invention relates to imaging, and more specifically to image analysis.

2. Discussion of the Related Art

The extraction of shape and feature information from images of any dimension, including but not limited to 2D and 3D, has many uses. One such use is in the field of Medical Imaging, where it can be used for polyp detection and polyp segmentation.

A current algorithm for shape characterization uses normal intersection for detecting shapes where normals to the visible surface are used. However, often the lines drawn in the normal directions might not intersect well; thus, the intersection point is not well defined. This process of extracting the visible surface and performing normal intersection is time consuming.

Another algorithm for shape characterization uses gradient concentration, which is computationally expensive.

SUMMARY OF THE INVENTION

An exemplary embodiment of the present invention includes a method of characterizing an image. The method comprising tobogganing one or more selected toboggan potentials to generate one or more toboggan parameters, wherein at least one of the selected toboggan potentials is selected from the image, or one or more portions of the image. Forming one or more toboggan clusters using at least one of the toboggan parameters. Selecting one or more of the toboggan clusters to compute one or more feature parameters.

Another exemplary embodiment of the present invention has one or more of the portions of the image comprise one or more volumes inside the image.

Another exemplary embodiment of the present invention has one or more of the volumes chosen by acquiring a detection location associated with at least one of the volumes. Extracting at least one of the volumes around the associated detection location.

Another exemplary embodiment of the present invention has one or more of the toboggan potentials selected after the image, or at least one of the portions of the image, has been further processed.

Another exemplary embodiment of the present invention has one or more of the toboggan potentials selected from the original image as, or at least one of the portions of the original image.

Another exemplary embodiment of the present invention has one or more of the toboggan parameters be at least one of: a toboggan direction, a toboggan label and both.

Another exemplary embodiment of the present invention has the step of selecting one or more of the toboggan clusters to compute one or more of the feature parameters further comprising merging two or more of the toboggan clusters to form at least one of the selected toboggan clusters.

Another exemplary embodiment of the present invention has the step of merging two or more of the toboggan clusters further comprising merging the toboggan clusters positioned within a certain distance from a detection location.

Another exemplary embodiment of the present invention has the step of merging two or more of the toboggan clusters further comprising merging the toboggan clusters selected by a Student's t-test.

Another exemplary embodiment of the present invention has at least one of the computed feature parameters be a statistical parameter.

Another exemplary embodiment of the present invention has the statistical parameter be at least one of a maximum value, a minimum value, a mean, a standard deviation of the direct distance, a direct distance, a sliding distance and distance ratio parameters.

Another exemplary embodiment of the present invention has one of the computed feature parameters be a shape characterizing parameter.

Another exemplary embodiment of the present invention has the shape characterizing parameter be at least one of a sphericity, an eccentricity and a surface isotropy measure.

Another exemplary embodiment of the present invention has the step of selecting one or more of the toboggan clusters to compute one or more of the feature parameters use one or more portions of at least one of the selected toboggan clusters to calculate at least one of the feature parameters.

Another exemplary embodiment of the present invention is a device for characterizing an image. The device uses an imager for acquiring an image to be analyzed. A selector is used for selecting one or more toboggan potentials from the image or one or more portions of the image. A tobogganing module is used for tobogganing at least one of the selected toboggan potentials to generate one or more toboggan parameters. A clustering module is used for forming one or more toboggan clusters using one or more of the toboggan parameters. A calculation module is used for selecting one or more of the toboggan clusters to compute at least one feature parameter.

Another exemplary embodiment of the present invention has the device acquire a detection location associated with at least one of the volumes and extract the volumes around the associated detection location.

Another exemplary embodiment of the present invention has the selector select at least one of the toboggan potentials after the image, or at least one of the portions of the image, has been further processed.

Another exemplary embodiment of the present invention has the selector select at least one of the toboggan potentials from the image as acquired, or at least one of the portions of the image as acquired.

Another exemplary embodiment of the present invention has at least one of the selected toboggan clusters be formed by merging two or more of the toboggan clusters.

Another exemplary embodiment of the present invention has two or more of the merged toboggan clusters be been positioned within a certain distance from a detection location.

Another exemplary embodiment of the present invention has two or more of the merged toboggan clusters are selected by a Student's t-test.

Another exemplary embodiment of the present invention has one or more portions of at least one of the selected toboggan clusters be used to compute at least one feature parameter.

Other exemplary embodiments of the present invention may include, but are not limited to, a program storage device readable by machine, tangibly embodying a program of instructions executable by the machine to perform a method of characterizing shapes in images, several exemplary embodiments of which are presented above.

DETAILED DESCRIPTION OF PREFERRED EMBODIMENTS

Exemplary embodiments of the current invention provide methods and apparatus for characterizing shapes in images or one or more portions of the image using a toboggan called Toboggan-Based Shape Characterization ("TBSC") are described herein. A toboggan is a construct where a pixel or a voxel in an image is associated with a slide direction and a concentration location. Exemplary embodiments of the present invention have many advantages over the prior art. One advantage is that TBSC is computationally efficient and does not require as much time and computing resources as other solutions. Another is that it provides new theoretical concepts including, but not limited to, capturing the discriminating capabilities of both normal intersection and gradient concentration methods. Because of this, among other improvements, it is a single method that is able to achieve both a high sensitivity and a low false positive rate.

Figure 1:
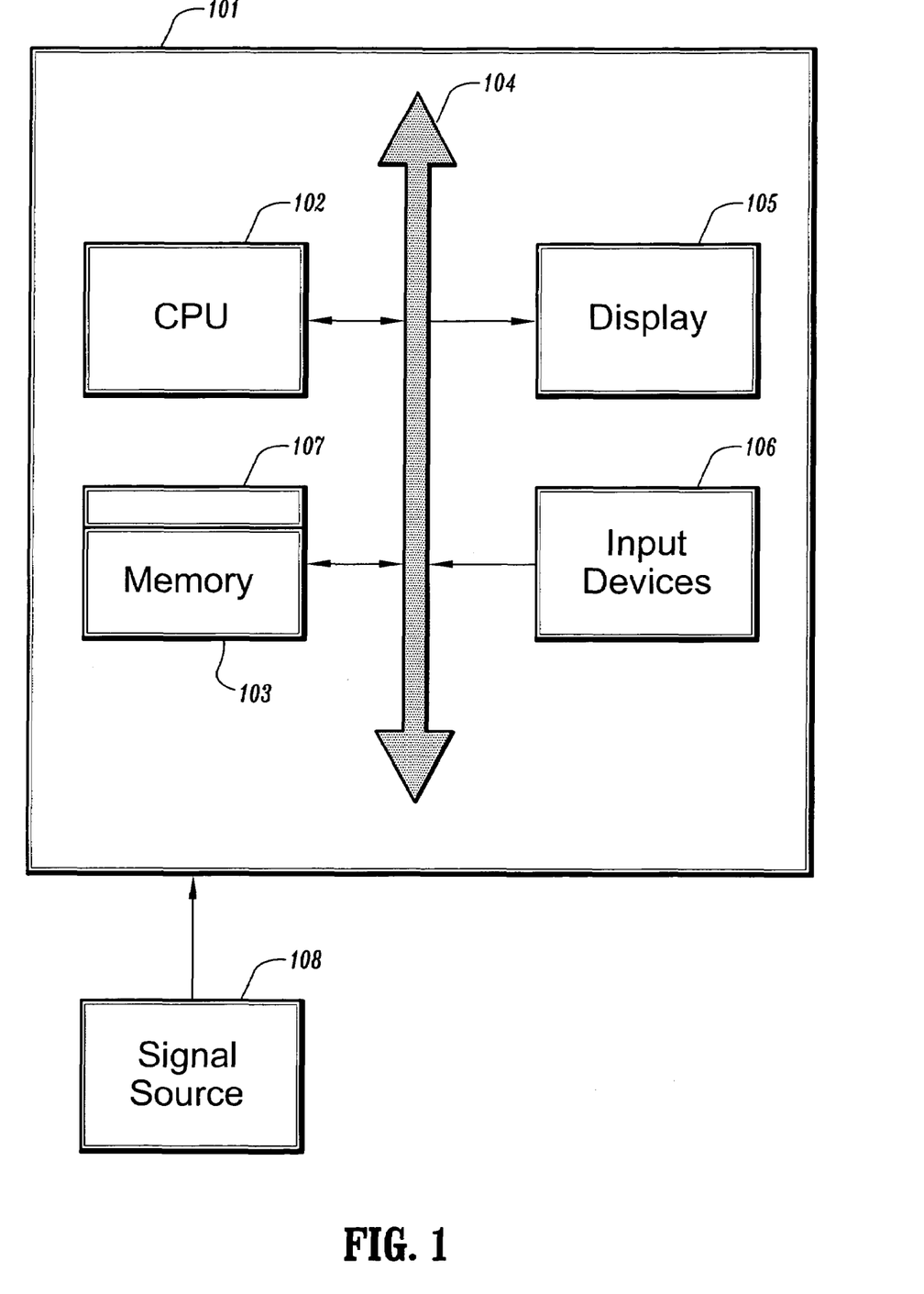
FIG. 1 is a schematic diagram illustrating an exemplary embodiment of a computer system.

Referring to FIG. 1, according to an exemplary embodiment of the present invention, a computer system 101 for implementing the present invention includes a central processing unit ("CPU") 102, a memory 103 and an input/output ("I/O") interface 104. The computer system 101 is generally coupled through the I/O interface 104 to a display 105 and various input devices 106 such as a mouse, keyboard, and medical imaging devices. The support circuits can include circuits such as cache, power supplies, clock circuits, and a communications bus. The memory 103 can include random access memory ("RAM"), read only memory ("ROM"), disk drive, tape drive, etc., or a combination thereof. The present invention can be implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer system 101 also includes an operating system and microinstruction code. The various processes and functions described herein may either be part of the microinstruction code or part of the application program (or a combination thereof), which is executed via the operating system. In addition, various other peripheral devices may be connected to the computer platform, such as an additional data storage device and a printing device.

In an exemplary embodiment of the present invention used to characterizing polyp shapes in virtual colonoscopy the TBSC assumes that the shape of interest has been located with a manual or automatic procedure. For example the polyp candidate may be manually clicked by a user with the mouse or automatically detected by a detection module. The output given by TBSC is one or more feature parameters, which may be directly displayed to the user or may be used by an automatic module for further processing, a classifier for example. One example of the further processing may be to decide whether the candidate is a polyp or not.

An exemplary embodiment of TBSC, in accordance with the current invention, uses tobogganing in order to characterize shapes. Tobogganing can be described as a non-iterative, single-parameter, linear execution time over-segmentation method. It is non-iterative in that it processes each image pixel or voxel only once, thus accounting for the linear execution time. It is a versatile algorithm that can be used for images with any number of dimensions including 1D, 2D and 3D as well as sets of images that vary over time. The term pixel and voxel is used interchangeably herein as one of ordinary skill in the art will know how to modify the current invention to work with either.

Figure 2:
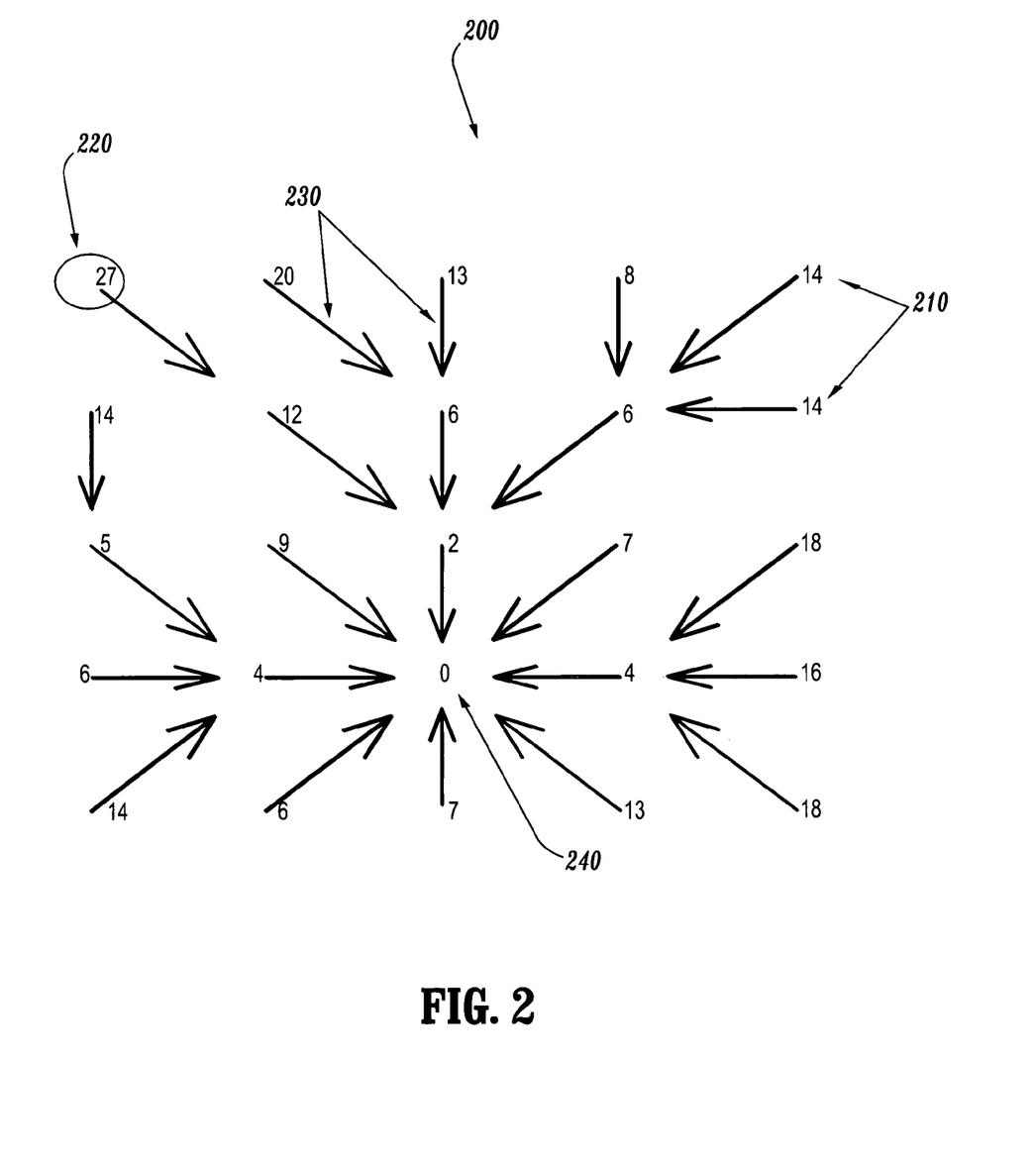
FIG. 2 is a graphical diagram depicting an exemplary embodiment of the tobogganing process in accordance with the present invention.

An exemplary embodiment of tobogganing in accordance with the present invention is depicted in FIG. 2. Here a simple example is used to illustrate the tobogganing process using a 5×5 2D toboggan potential map 200. Reference numeral 210 points to pixels of the image, with each number in the map representing the toboggan potential value at that pixel. This toboggan potential value may be calculated by processing the source image data using any number of means including, but not limited to, smoothing a gradient magnitude map of the source image with a Gaussian filter, or other smoothing filter, and calculation of a distance map with a distance transform. In some applications however, the toboggan potential can be the original image or at least one or more volumes within the original image without any processing. These volumes may be further partitioned into one or more sub-volumes. The analysis methods described herein remains predominately the same whether they are done for an entire image, a volume, or a sub-volume; thus, one of ordinary skill in the art would be able to modify the methods and apparatus described herein to work with any of these. Each pixel is said to slide to its immediate neighbor with the lowest potential. The arrow 230 originating at each pixel 210 indicates this slide direction for the pixel. For example the circled pixel 220, chosen for no particular reason, has a potential of 27. 12, 14 and 20 are the potentials of the pixels 210 that are its immediate neighbors. As 12 is the lowest value, the arrow 230 emanating from the circled pixel 220 points to the pixel with a potential of 12. In cases where the pixel is surrounded by more than one pixel that has the same minimal potential, the first pixel found with this value can be chosen or other strategies may be used in selecting a neighbor. In the case where the lowest potential around a pixel has the same value as the pixel itself, the pixel does not slide anywhere and no arrow is drawn. The different locations that the pixels slide to are called concentration locations forming toboggan clusters. In this example all the pixels slide to the same concentration location, the pixel 240 with a potential of 0, forming a single toboggan cluster. All the pixels or voxels that "slide" to the same location are grouped together, thus portioning the image volume into a collection of pixel clusters known as toboggan clusters.

In another exemplary embodiment, not pictured, the pixel may slide to its neighbor with the highest potential.

The sliding distance s of a pixel in a toboggan cluster is defined as the length of its sliding path to its concentration location. The direct distance d of a pixel is defined as the Euclidean distance from the pixel to its concentration location. The direct and sliding distance ratio is naturally defined as d/s. For instance, the sliding distance for the circled pixel in FIG. 2 is $\sqrt{2}+\sqrt{2}+1=3.8284$, its direct distance is $\sqrt{(3-1)^2+(4-1)^2}=3.6506$, and the direct and sliding distance ratio is 3.6506/3.8284=0.9418. The direct and sliding distance ratio can also be called the distance ratio.

Figure 3:
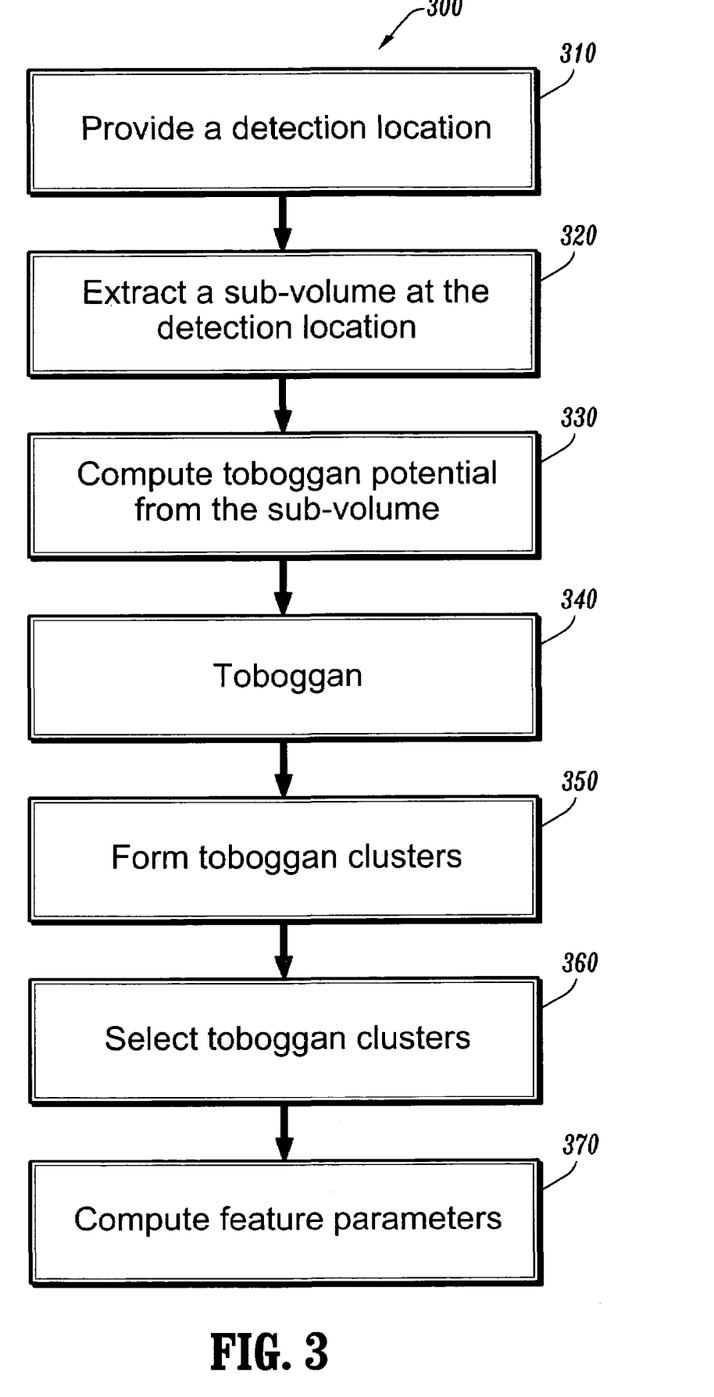
FIG. 3 is a flow diagram illustrating an exemplary algorithm for feature characterization in accordance with the present invention.

FIG. 3 is a flow diagram depicts an exemplary TBSC algorithm in accordance with the current invention and is indicated generally by reference numeral 300. Block 310 indicates the initial detection location that is provided by a user or other system.

Figure 4:
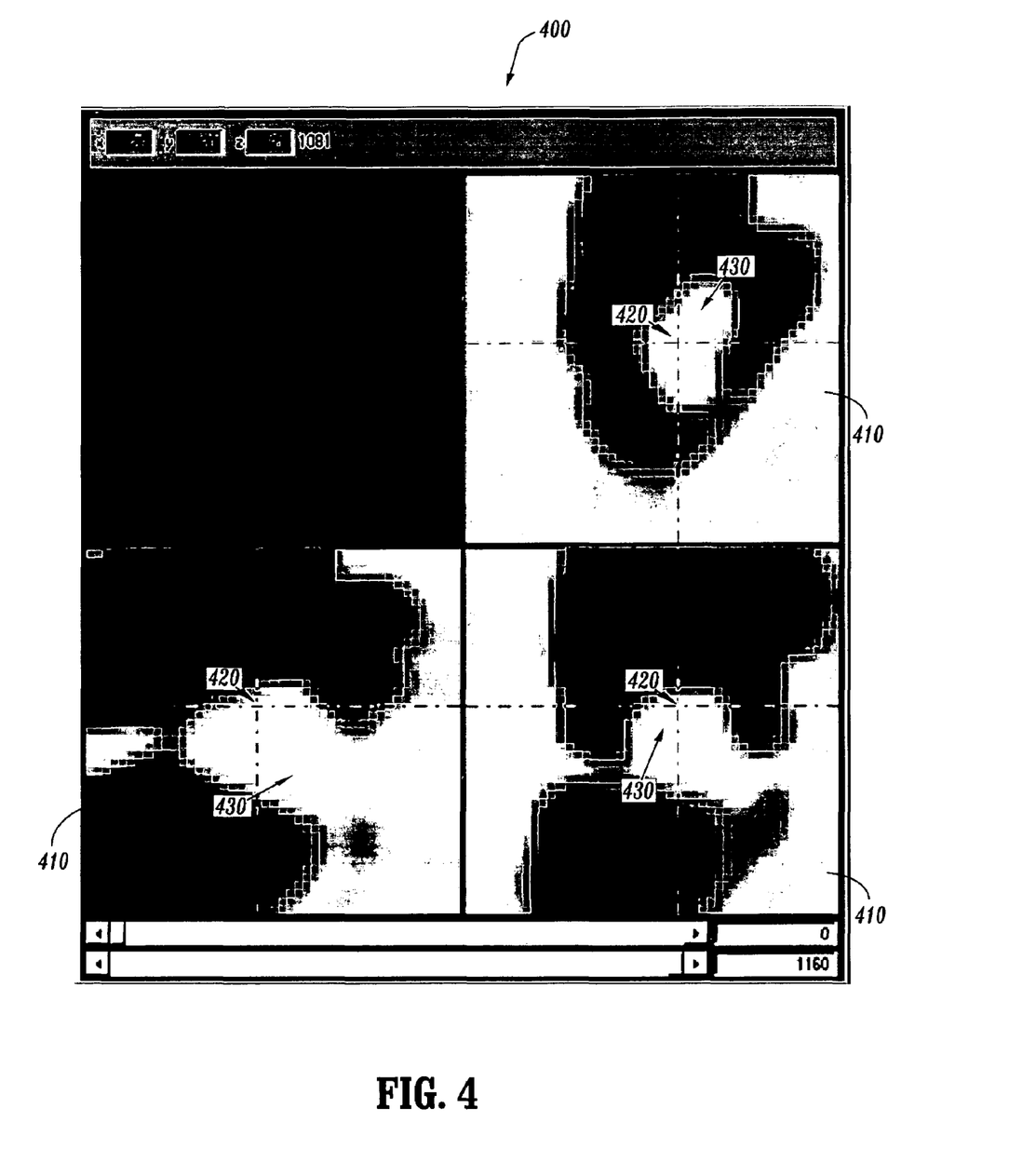
FIG. 4 is a medical image depicting an exemplary embodiment in accordance with the present invention.

Block 320 represents the step of extracting a volume or a sub sub-volume, either isotropic or anisotropic from the detection location using any number of methods already known in the art. An example of this is depicted in FIG. 4, which is described below. In some application, one may choose to work on the original image with or without restricting to a region of interest, instead of explicitly extracting the volume or sub-volume from the original image; thus, this step may be skipped in other exemplary embodiments of the current invention.

Block 330 represents the step of computing the toboggan potential for the extracted volume or sub-volume. There are several ways in which the toboggan potential can be calculated. These methods include, but are not limited to, processing the image or volume using a smoothing filter, smoothed gradient magnitude analysis, colon wall segmentation with a smoothing operation, and distance transform algorithms. In some applications, the original image or a volume within the image may be used directly as toboggan potentials, without any further processing; thus, this step may be skipped in other exemplary embodiments of the current invention.

Figure 5A:
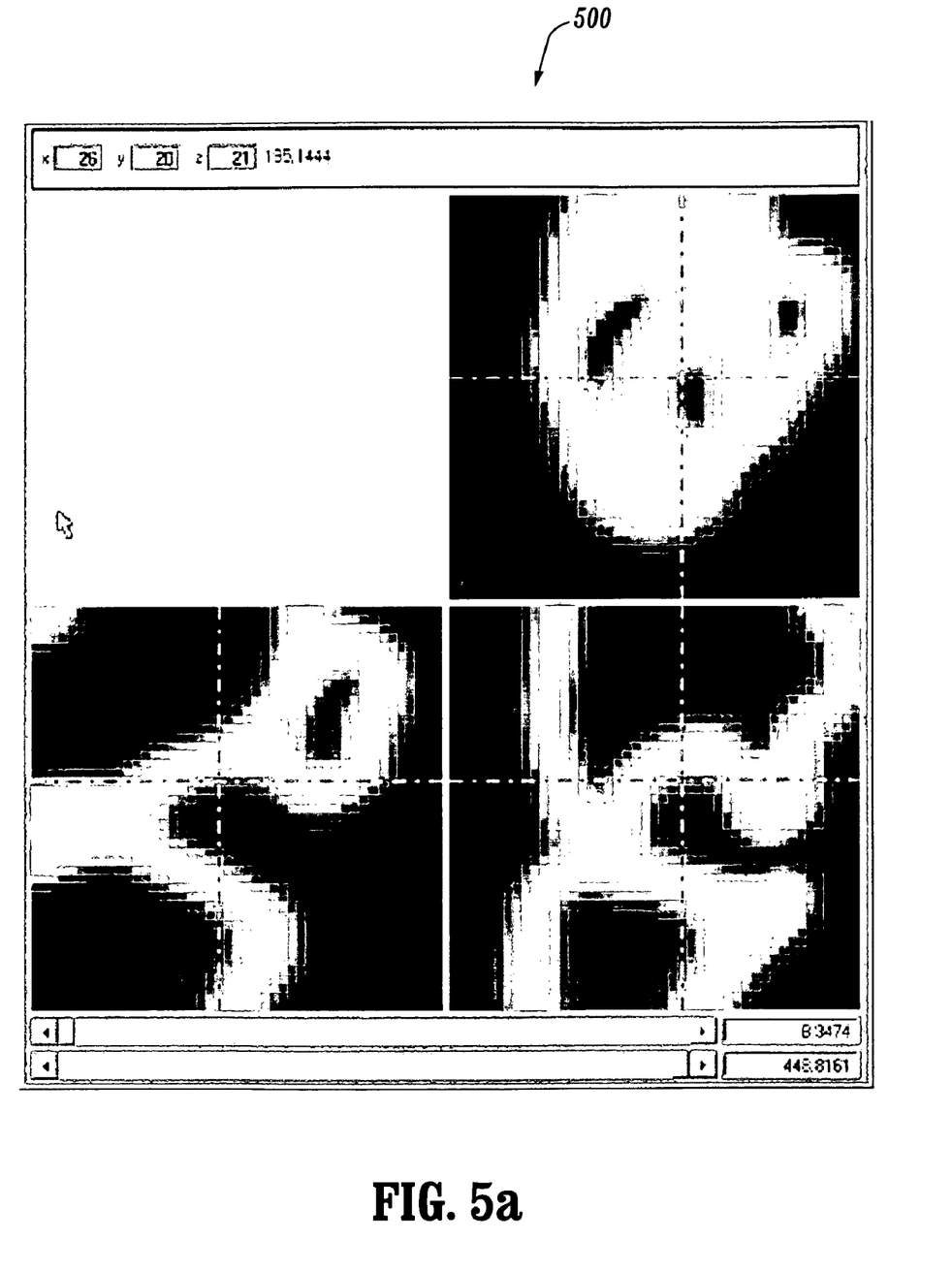
FIG. 5a is a medical image depicting an exemplary embodiment of computing the toboggan potential using the gradient magnitude smoothed with a Gaussian filter ($\sigma=1.5$), in accordance with the present invention.
Figure 5B:
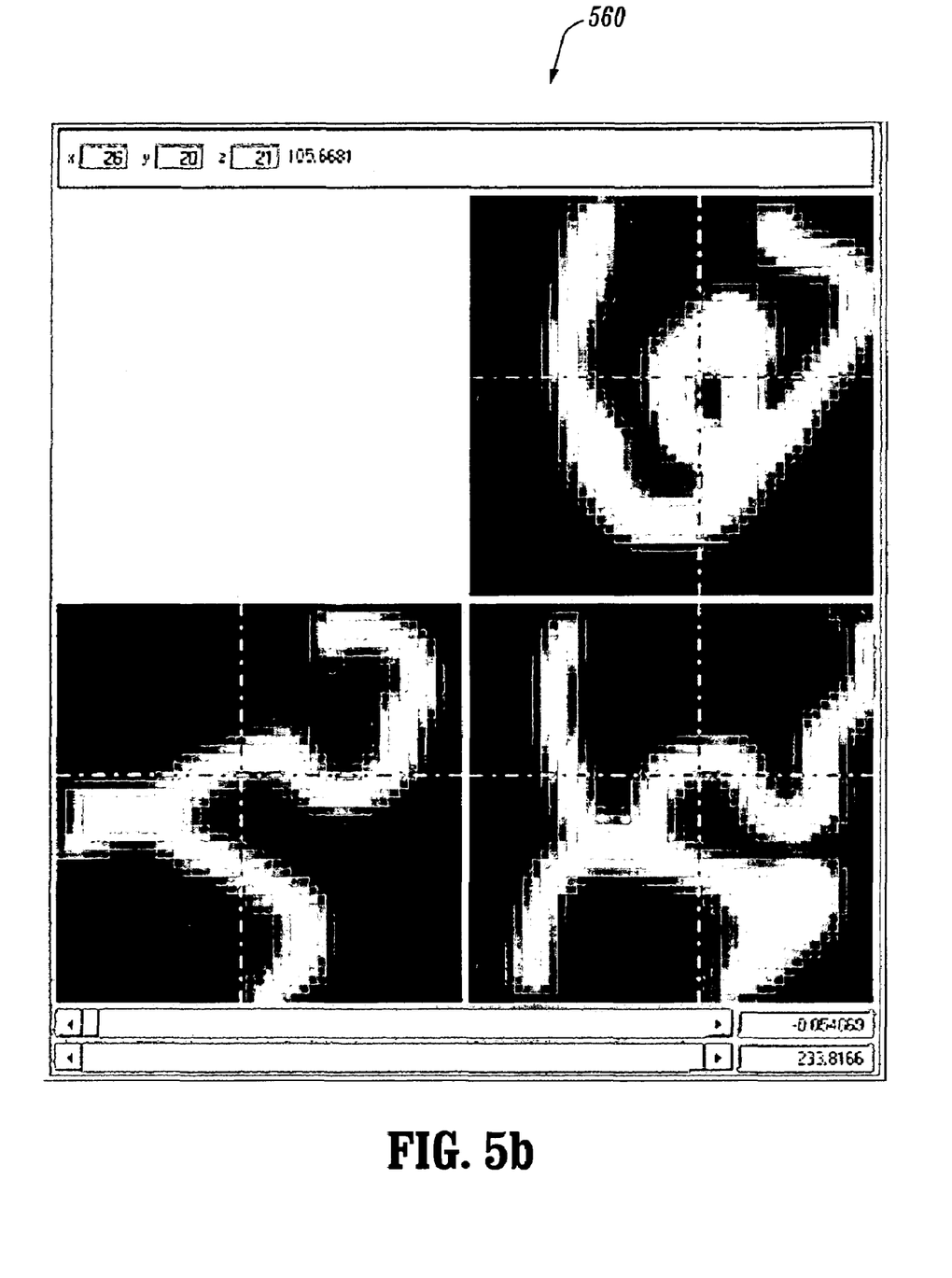
FIG. 5b is a medical image depicting an exemplary embodiment of computing the toboggan potential using the colon wall smoothed with a Gaussian filter ($\sigma=1.5$) in accordance with the present invention.
Figure 8A:
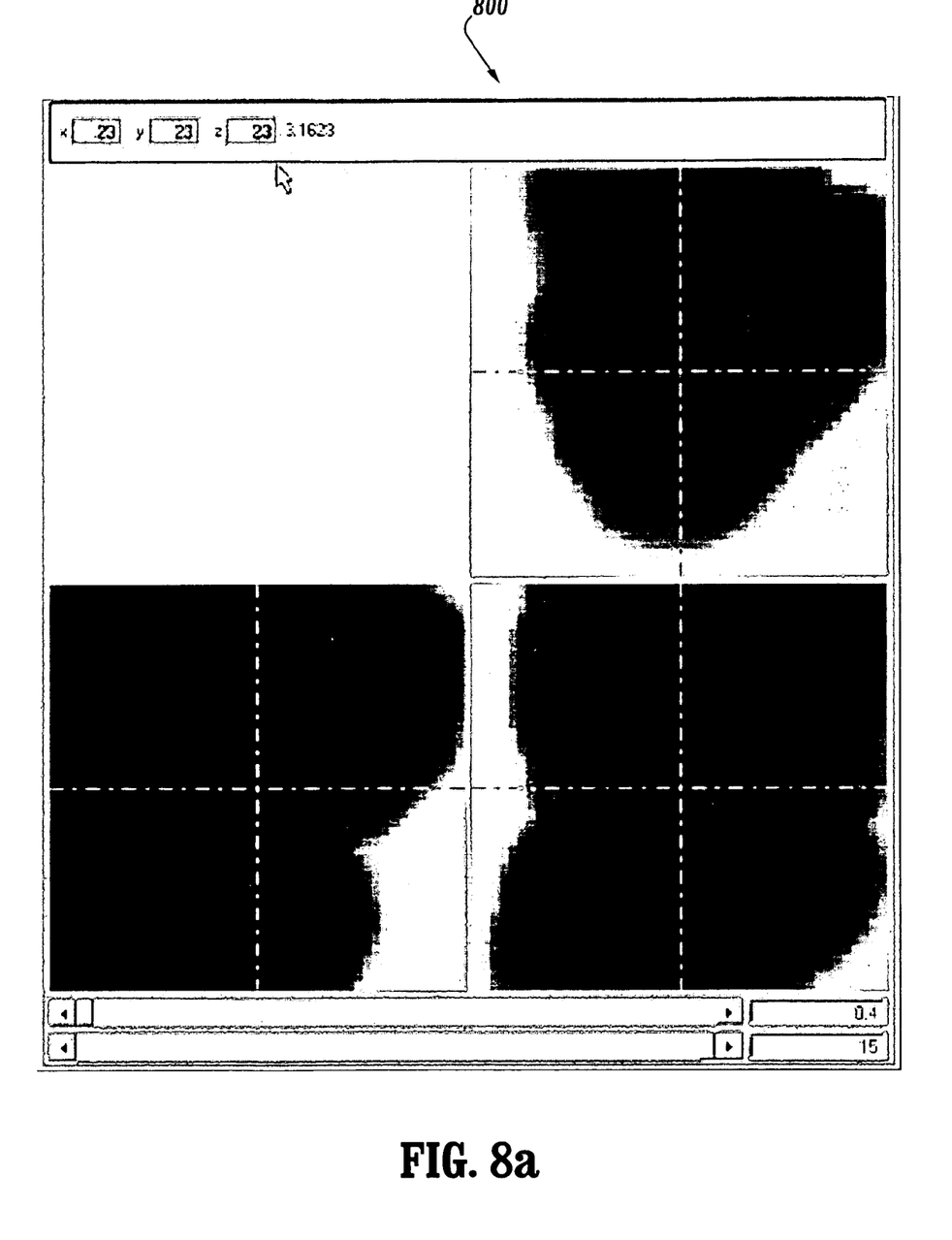
FIG. 8a is a medical image depicting an exemplary embodiment of the present invention depicting a distance map.

FIG. 5(*a*) shows an exemplary embodiment of the current invention where the gradient magnitude was computed from the original sub-volume depicted in FIG. 4 and smoothed with a Gaussian filter. FIG. 5(*b*) depicts the smoothed colon wall, which may be used as a toboggan potential. FIGS. 5*a* and 5*b* are described in detail hereinafter. Depending on the applications, multiple scales (for instance, four scales) may be used, where gradient magnitude (or the colon wall) is smoothed with different kernel sizes (different σ). FIG. 8(*a*), described in more detail hereinafter, presents a distance map, which can be also used as toboggan potential for polyp feature extraction. The resulting toboggan clusters may differ, but the polyp surface points largely remain the same.

Figure 8B:
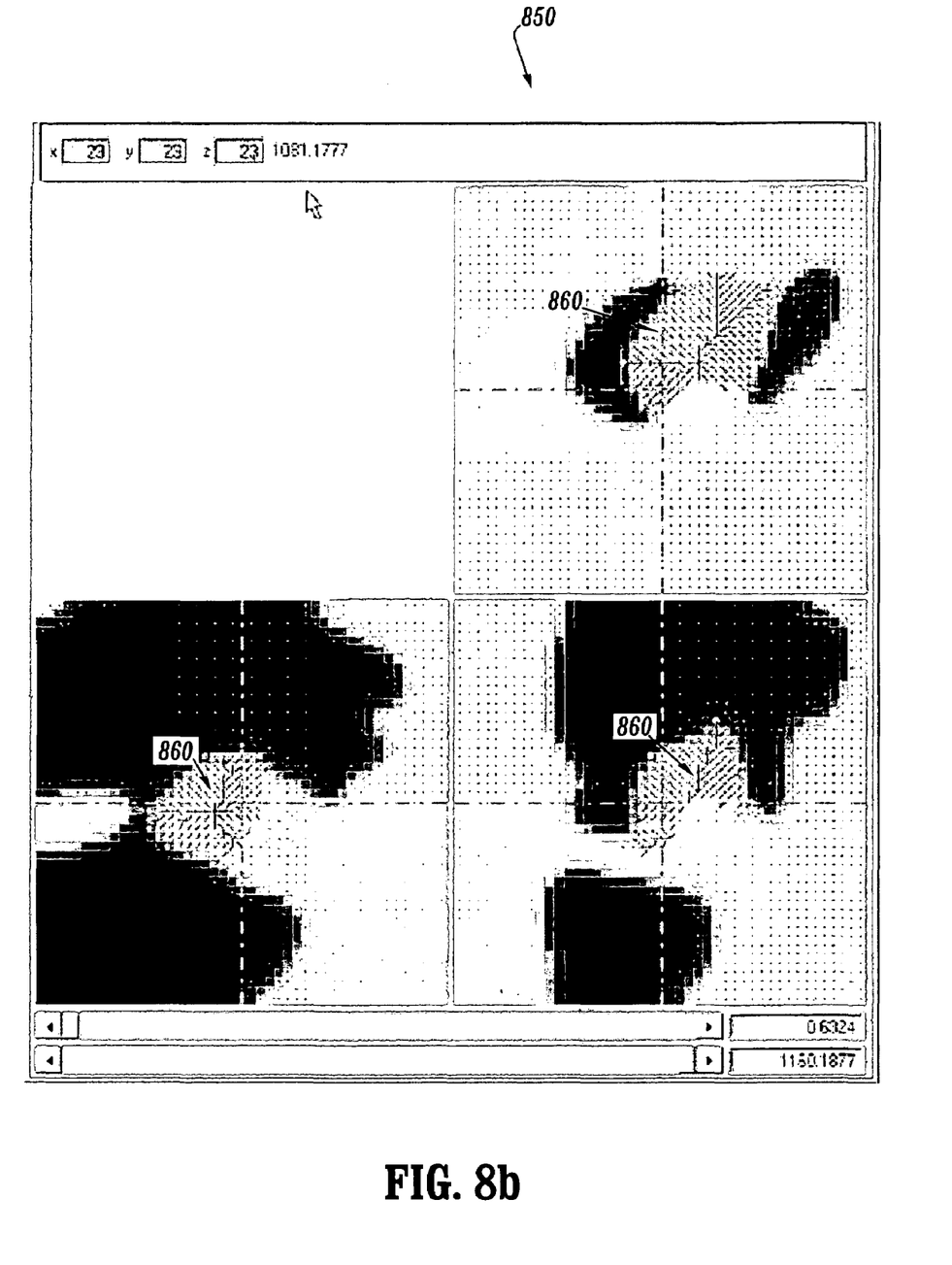
FIG. 8b is a medical image depicting an exemplary embodiment of the present invention depicting toboggan cluster superimposed on the original sub volume.

Block 340 represents the step of tobogganing. In this step, as discussed above, each voxel in the volume slides to one of its neighbors according to the computed toboggan potential. If the voxel itself has an even lower potential than any of its neighbors, it does not slide and becomes a concentration location. This generates toboggan parameters that include, but are not limited to, the toboggan direction and the toboggan label for each voxel. The selection of a neighbor depends on the application and the computation of toboggan potential. For instance, in an exemplary embodiment of polyp feature extraction, in accordance with the present invention, the gradient magnitude is used to calculate the toboggan potential and the neighbor with the minimal potential is selected. In another exemplary embodiment, in accordance with the present invention, where colon segmentation with a distance transform is used to calculate the toboggan potential (called distance map potential), the neighbor with the maximal potential is selected. Alternatively, a transform on the distance map can be performed, so that the voxels still can slide to their neighbors with minimal potential and yield the same results. FIG. 8*b*, described below, illustrates the tobogganing process with the distance map potential pictured in FIG. 8*a*.

In an exemplary embodiment of the present invention the tobogganing process may be restricted to a small region or sub-volume based on the applications, that is, it is not necessary for all the voxels to slide in the image or volume. For instance, in case of polyp feature extraction, only the search region along the colon wall if of interest, and there is no need for other voxels in the air (or on the bone) to slide. This accelerates the tobogganing process.

Figure 6:
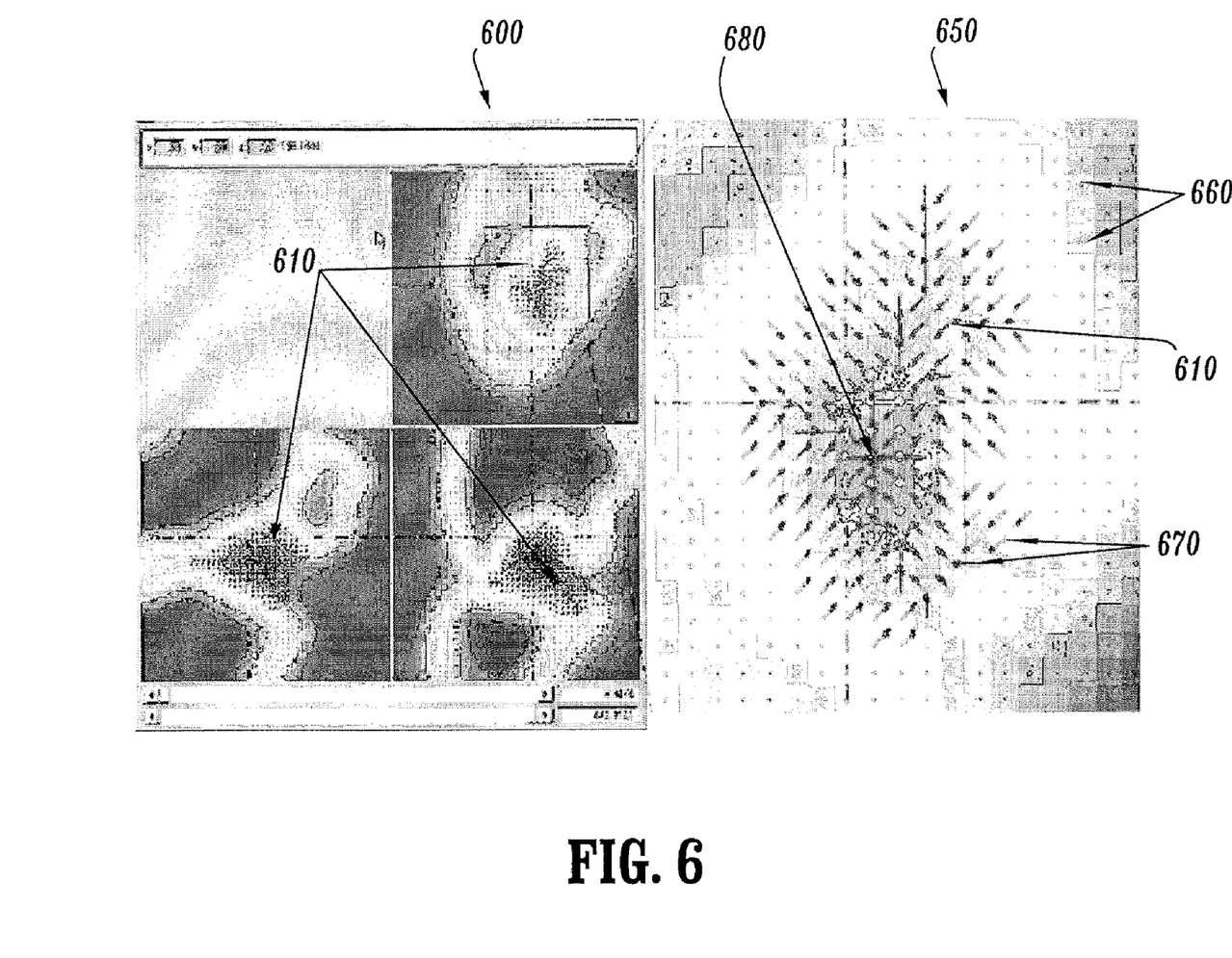
FIG. 6 is a medical image depicting a toboggan cluster superimposed on the toboggan potential depicted in FIG. 5a with a zoomed in region in accordance with the current invention.

Block 350 represents the step of forming toboggan clusters. These clusters are based on the toboggan parameters including, but not limited to, the toboggan direction, the toboggan label, or both. The tobogganing process can generate a toboggan direction for each voxel. All the voxels that slide to the same concentration location are associated with a unique cluster label, also known as a toboggan label, and grouped into one toboggan cluster. An example of a toboggan cluster is depicted in FIG. 6, which is described herein below. For the purpose of illustration, Block 340 and Block 350 were separated. It should be noted that in other exemplary embodiments the tobogganing process Block 340 could automatically generate the toboggan clusters; therefore, Block 340 and Block 350 can be integrated into one step.

Block 360 represents the step of selecting one or more toboggan clusters for analysis. Tobogganing is an efficient image segmentation technique. One toboggan cluster usually corresponds to the shape of interest, as in the examples shown in FIGS. 7 and 8, and this step is not necessary. However, there are some cases where the shape of interest may be broken into multiple toboggan clusters and a merging strategy would be required. It is sometimes desirable to merge those toboggan clusters which represent the shape of interest into one big cluster. In the illustrated example shown in FIG. 6, only one toboggan cluster is selected. Various criteria may be used for selecting toboggan clusters, for instance, select those toboggan clusters concentrated within a certain distance from the detection location. More sophisticated approaches, for instance the Student's t-test, may be used as well.

Block 370 represents the step of computing feature parameters based on the selected toboggan clusters. For each voxel in a cluster, the direct distance and sliding distance from the voxel to its concentration location may be computed. The distance ratio for the voxel may be derived from its direct distance and its sliding distance, as discussed above. If the toboggan cluster is sphere-like, the distance ratio is large and close to 1 for each voxel. In some application, it would be more applicable and efficient to compute one or more parameters based on a subset of the voxels in the toboggan cluster. For instance, the direct distance, sliding distance, and distance ratio parameters only for those peripheral voxels (no voxel sliding to them) may be computed.

In an exemplary embodiment of the current invention surface voxels may be identified based on the toboggan potential and feature parameters may need to be computed only for those surface voxels. This is the case many times for polyps in virtual colonoscopy.

In an exemplary embodiment of the current invention any number of parameters may be calculated. For the whole set of the selected toboggan clusters, it is possible to compute statistical parameters, for instance, max, min, mean and standard derivation of the direct distance, sliding distance and distance ratio parameters. In addition, the parameters to characterize the shape of the toboggan clusters or their parts can be computed. For instance, the sphericity may be captured by three Eigen values and their ratios based on principle component analysis; the sphericity may also be captured based on the relation of the volume and the surface area of the toboggan clusters as well. The eccentricity, well known in the art, maybe calculated as well. The eccentricity can be characterized as a relation between the major axes of the toboggan cluster and may be computed based on the Eigen values and Eigen vectors of the toboggan cluster.

In another exemplary embodiment of the present invention other shape parameters such as the surface isotropy measure may also be computed. The surface isotropy measure depends on the local concentration of a location ("LCL") and its minimum distance to the surface of the cluster. LCL value identifies the number of voxels that slide to the location of the LCL. The location can be any location and does not have to be the concentration location of the whole toboggan cluster. A voxel on the surface of a toboggan cluster has a concentration of zero (no voxel sliding to it), while the global concentration location of the whole toboggan cluster ("GCL") is associated with the total number of the voxels in the toboggan cluster. The minimum distance refers to the shortest distance from the location of an LCL to the surface of the toboggan cluster (the colon wall in the context of polyp characterization and feature extraction). Then the surface isotropy measure is defined as the ratio of the LCL and the minimum distance. The higher the ratio the more round something is. Thus the case of polyp characterization this ratio is expected to be higher for locations where polyps might be found. Voxels in the toboggan clusters may also be partitioned into layers and the properties of each layer can be examined; these properties include, but are not limited to, sphericity, eccentricity and surface isotropy measure.

Referring to FIG. 4, an exemplary embodiment in accordance with the present invention is depicted. Here medical image 400 depicts an example of the sub-volume 410 for a polyp candidate. Three orthogonal views 410 of the same 3D dataset are shown. Each of the views 410 represents a different orthogonal view of the same volume extracted from a larger image, not shown. The intersection of the crosshairs 420 in each of the views 410 indicates the detection location chosen by the operator or a computer system as a possible polyp candidate. In the three views 410, the detection location 420 represents the center of the selected volume. In implementing the method, one may directly work on the original image or volume without explicitly extracting a volume or a sub-volume thereof. The brighter region 430 is a sub-volume that represents a polyp. It was segmented using the analysis methods that is the subject matter of the present invention.

FIGS. 5a and 5b depict another exemplary embodiment in accordance with the present invention. Medical images 500 and 560, as discussed earlier, depict the calculation of the toboggan potentials for the medical image 400. Medical image 500 shows the results of calculating the toboggan potential using the gradient magnitude smoothed with a Gaussian filter with an σ=1.5. Medical image 560 shows the results of calculating the toboggan potential using the colon wall smoothed with a Gaussian Filter with an σ=1.5.

FIG. 6 depicts another exemplary embodiment in accordance with the present invention. It depicts a medical image 600 with a toboggan cluster 610 superimposed on the toboggan potential depicted in FIG. 5a by medical image 500. Also depicted is a zoomed in portion 650 that enlarges a portion of medical image 600. The toboggan cluster 610 has been calculated for the extracted sub-volume 410. Each square 660 represents a voxel. The arrows 670 represent the slide direction for each voxel toward the surrounding voxel with the lowest potential. Voxel 680 is the concentration location for the toboggan cluster 610.

Figure 7:
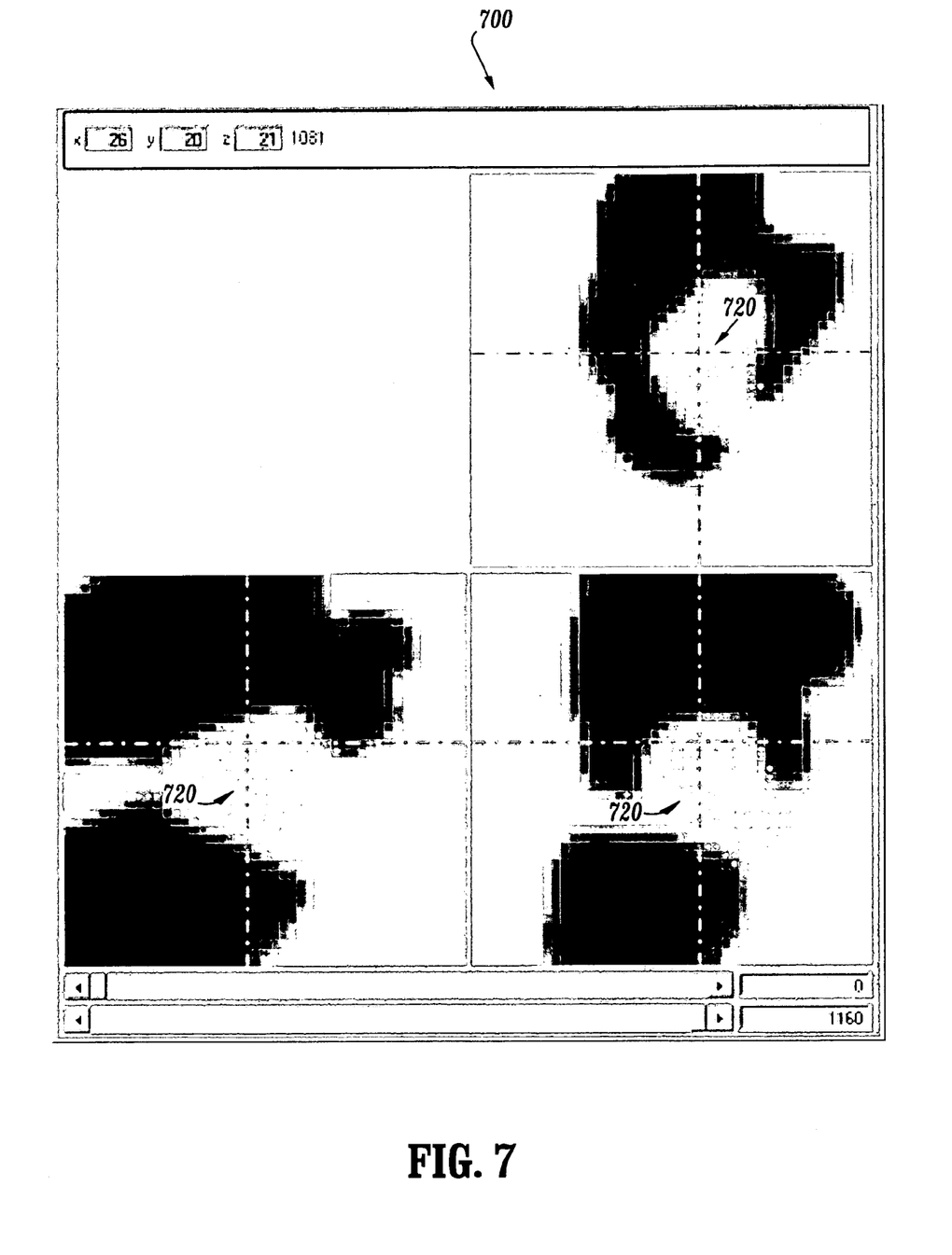
FIG. 7 is a medical image depicting an exemplary embodiment of the present invention where a toboggan cluster is superimposed on an original sub-volume.

FIG. 7, indicated generally by 700 depicts a toboggan cluster 720 superimposed onto the original volume 410 depicted in FIG. 4. This toboggan cluster 720 is a segmentation of the polyp that is represented as the highlighted region 430 in FIG. 4.

FIGS. 8a and 8b depict an exemplary embodiment of tobogganing using a distance transform in accordance of the present invention. The medical image 800 depicts a distance map computed from the same sub-volume 410 in FIG. 4. The medical image 850 depicts the formed toboggan cluster 860 superimposed on the original extracted sub-volume from which the distance map 800 was calculated.

Figure 9:
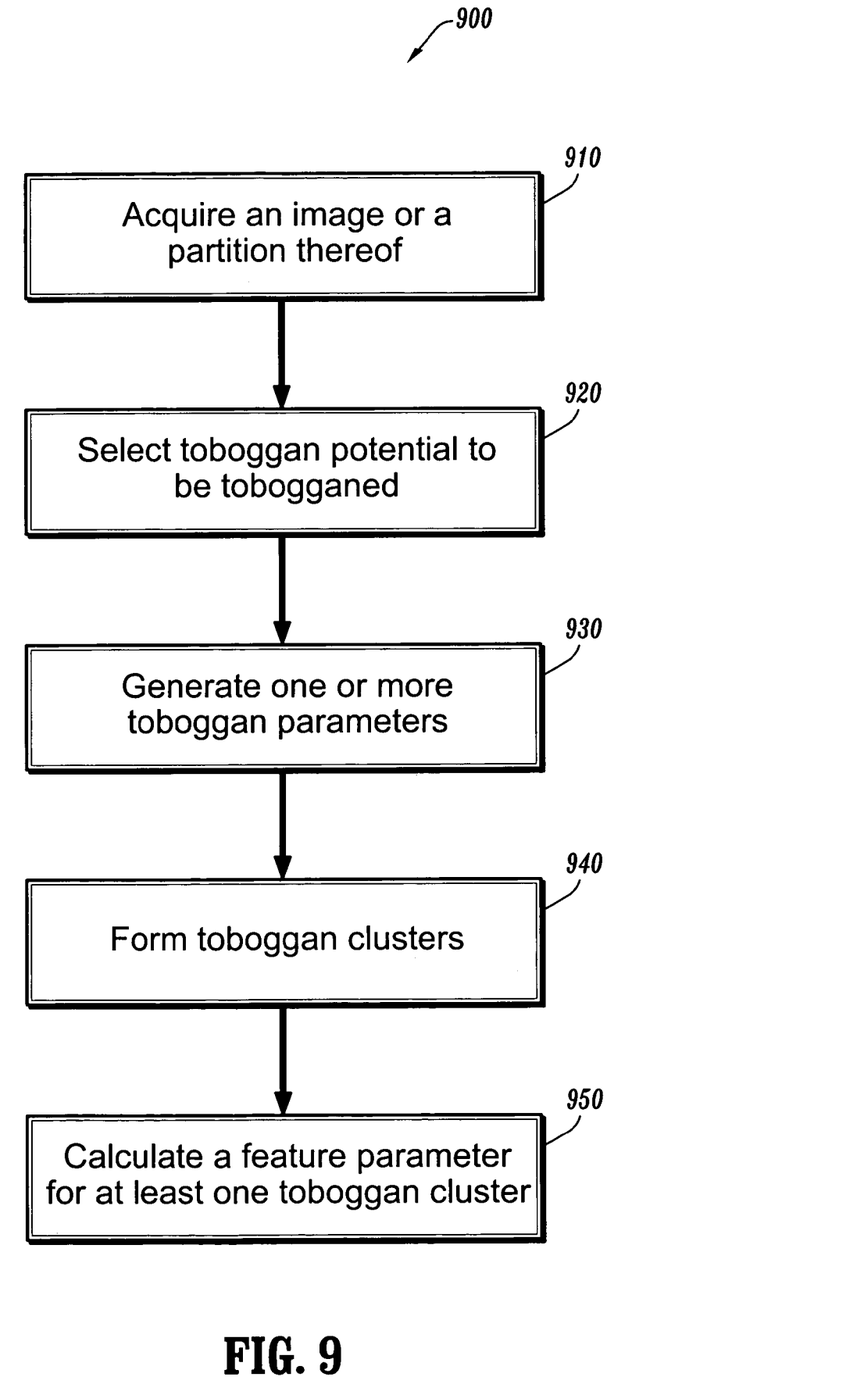
FIG. 9 is a flow diagram illustrating another exemplary algorithm for feature characterization in accordance with the present invention.

FIG. 9 is a flow diagram that depicts another exemplary embodiment of the present invention, indicated generally by reference numeral 900. Block 910 represents the step of acquiring an image or a portion there of to be analyzed. Block 920 represents the step of selecting toboggan potentials, from the original image, or the portion thereof. The image or the portion thereof maybe further processed before selection of the toboggan potentials. Block 930 represents the step of generating one or more toboggan parameters by tobogganing the toboggan potentials. Block 940 represents the step of forming one or more toboggan clusters using the toboggan parameters. Block 950 represents the step of selecting one ore more toboggan parameters to calculate at least one feature parameter.

Figure 10:
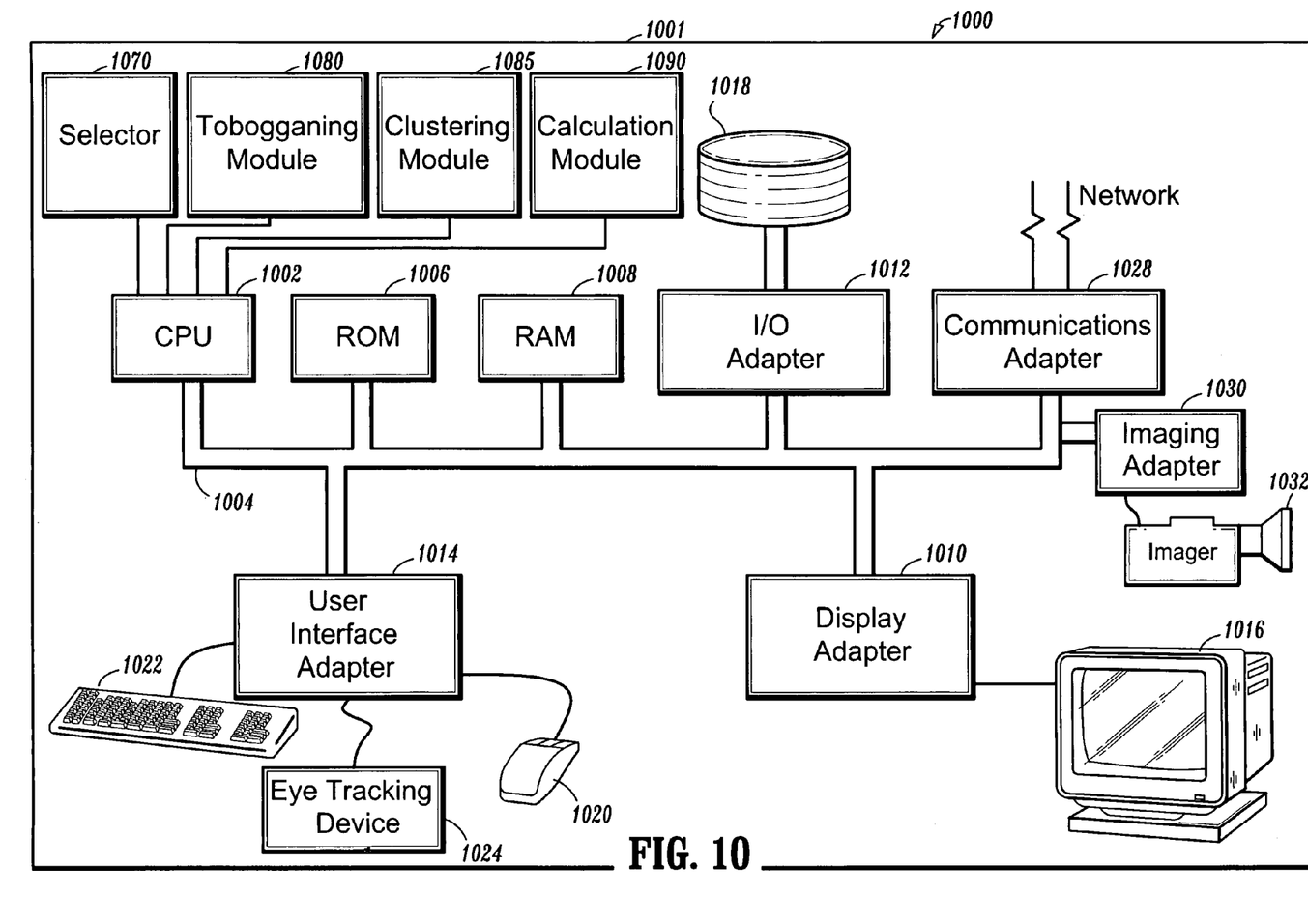
FIG. 10 shows a block diagram of a device for method of characterizing an image in accordance with the present invention.

Referring to FIG. 10, a device for characterizing an image according to an illustrative embodiment of the present invention is depicted and indicated generally by the reference numeral 1000. The device 1001 includes at least one processor or central processing unit ("CPU") 1002 in signal communication with a system bus 1004. A read only memory ("ROM") 1006, a random access memory ("RAM") 1008, a display adapter 1010, an I/O adapter 1012, a user interface adapter 1014, a communications adapter 1028, and an imaging adapter 1030 are also in signal communication with the system bus 1004. A display unit 1016 is in signal communication with the system bus 1004 via the display adapter 1010. A disk storage unit 1018, such as, for example, a magnetic or optical disk storage unit is in signal communication with the system bus 1004 via the I/O adapter 1012. A mouse 1020, a keyboard 1022, and an eye tracking device 1024 are in signal communication with the system bus 1004 via the user interface adapter 1014. An imager for acquiring an image to be analyzed 1032 is in signal communication with the system bus 1004 via the imaging adapter 1030.

Selector unit 1070 is used for selecting one or more toboggan potentials from the image or one or more portions of the image. The tobogganing module unit 1080 is used for tobogganing at least one of the selected toboggan potentials to generate one or more toboggan parameters. The clustering module unit 1085 forms one or more toboggan clusters using one or more of the toboggan parameters. The calculation module unit 1090 selects one or more of the toboggan clusters to compute at least one feature parameter. This selection can either be automatic based on some criterion, decided by an external device, or manually by an operator. Each of these units is in signal communication with the CPU 1002 and the system bus 1004. While these units are illustrated as coupled to the at least one processor or CPU 1002, these components may be embodied in computer program code stored in at least one of the memories 1006, 1008 and 1018, wherein the computer program code is executed by the CPU 1002. As will be recognized by those of ordinary skill in the pertinent art based on the teachings herein, alternate embodiments are possible, such as, for example, embodying some or all of the computer program code in registers located on the processor chip 1002. Another example of an alternative embodiment in accordance with the present invention is where one or more of the components of device 1001 are implemented in physically separate devices all of which are in signal communications with each other. Given the teachings herein, those of ordinary skill in the pertinent art will contemplate various alternate configurations and implementations of the tobogganing module 1080 and the calculation module 1090, as well as the other elements of device 1001, while practicing within the scope and spirit of the present invention.

Other exemplary embodiments of the present invention may be used for detection, segmentation and feature extraction of lung nodules, breast lesions, liver lesions, prostrate cancer, pulmonary embolism, as well as pathologies having similar characterization and occurring in other portions of the body.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It should also be understood that the above description is only representative of illustrative embodiments. For the convenience of the reader, the above description has focused on a representative sample of possible embodiments, that are illustrative of the principles of the invention, and has not attempted to exhaustively enumerate all possible variations. That alternative embodiments may not have been presented for a specific portion of the invention is not to be considered a disclaimer of those alternate embodiments. Other applications and embodiments can be straightforwardly implemented without departing from the spirit and scope of the present invention. It is therefore intended, that the invention not be limited to the specifically described embodiments, but the invention is to be defined in accordance with that claims that follow. It can be appreciated that many of those undescribed embodiments are within the literal scope of the following claims, and that others are equivalent.

What is claimed is:

1. A method of characterizing an image, the method comprising:

tobogganing one or more selected toboggan potentials to generate one or more toboggan parameters, wherein at least one of the selected toboggan potentials is selected from the image, or one or more portions of the image;

forming one or more toboggan clusters using at least one of the toboggan parameters; and selecting one or more of the toboggan clusters to compute one or more feature parameters, wherein said feature parameters include a slide direction, a direct distance and a sliding distance from a voxel to its concentration location, and a distance ratio from the direct distance and sliding distance, wherein said distance ratio is a measure of a sphericity of a cluster, wherein computing feature parameters includes calculating a surface isotropy measure as a ratio of a local concentration of a location ("LCL") and a minimum distance to a surface of a cluster for a selected toboggan cluster, wherein the LCL value identifies a number of voxels that slide to a location, and the minimum distance is a shortest distance from the location of the LCL to the surface of the toboggan cluster.

2. A method as defined in claim 1, wherein one or more of the portions of the image comprises one or more volumes inside the image.

3. A method as defined in claim 2, wherein one or more of the volumes are chosen by:

acquiring a detection location associated with at least one of the volumes; and extracting at least one of the volumes around the associated detection location.

4. A method as defined in claim 1, wherein one or more of the toboggan potentials are selected after the image, or at least one of the portions of the image, has been further processed.

5. A method as defined in claim 1, wherein one or more of the toboggan potentials are selected from the original image, or at least one of the portions of the original image.

6. A method as defined in claim 1, wherein one or more of the toboggan parameters are at least one of a toboggan direction, a toboggan label and both.

7. A method as defined in claim 1, wherein the step of selecting one or more of the toboggan clusters to compute one or more of the feature parameters further comprising merging two or more of the toboggan clusters to form at least one of the selected toboggan clusters.

8. A method as defined in claim 7, wherein the step of merging two or more of the toboggan clusters further comprising merging the toboggan clusters positioned within a certain distance from a detection location.

9. A method as defined in claim 7, wherein the step of merging two or more of the toboggan clusters further comprising merging the toboggan clusters selected by a Student's t-test.

10. A method as defined in claim 1, wherein the step of selecting one or more of the toboggan clusters to compute one or more of the feature parameters uses one or more portions of at least one of the selected toboggan clusters to calculate at least one of the feature parameters.

11. The method of claim 1, wherein said feature parameters are computed for each voxel in a cluster.

12. The method of claim 1, wherein said feature parameters are computed for peripheral voxels in a cluster, wherein a peripheral has no voxels sliding into it.

13. The method of claim 1, wherein said feature parameters are computed for surface voxels, wherein surface voxels are identified based on their toboggan potential.

14. The method of claim 1, wherein computing feature parameters include computing statistical parameters, including one or more of a maximum, minimum, mean and standard derivation of a direct distance, sliding distance and distance ratio of each voxel in a selected toboggan cluster.

15. The method of claim 1, wherein computing feature parameters includes computing a volume, surface area, major and minor axes, eigenvalues and eigenvectors, sphericity and eccentricity for a selected toboggan cluster.

16. The method of claim 1, further comprising partitioning voxels in a toboggan cluster into layers and calculating feature parameters for each layer.

17. The method of claim 16, wherein said feature parameters include sphericity, eccentricity and surface isotropy.

18. The method of claim 1, wherein said toboggan potential is a distance map.

19. A program storage device readable by machine, tangibly embodying a program of instructions executable by the machine to perform a method of characterizing an image, the program steps comprising:
  tobogganing one or more selected toboggan potentials to generate one or more toboggan parameters, wherein at least one of the selected toboggan potentials is selected from the image, or one or more portions of the image;
  forming one or more toboggan clusters using at least one of the toboggan parameters; and
  selecting one or more of the toboggan clusters to compute one or more feature parameters, wherein said feature parameters include a slide direction, a direct distance and a sliding distance from a voxel to its concentration location, and a distance ratio from the direct distance and sliding distance, wherein said distance ratio is a measure of a sphericity of a cluster, wherein computing feature parameters includes calculating a surface isotropy measure as a ratio of a local concentration of a location ("LCL") and a minimum distance to a surface of a cluster for a selected toboggan cluster, wherein the LCL value identifies a number of voxels that slide to a location, and the minimum distance is a shortest distance from the location of the LCL to the surface of the toboggan cluster.

20. A program storage device as defined in claim 19, wherein the step of selecting one or more of the toboggan clusters to compute one or more of the feature parameters uses one or more portions of at least one of the selected toboggan clusters to calculate at least one of the feature parameters.

21. A program storage device as defined in claim 19, wherein said feature parameters are computed for each voxel in a cluster.

22. A program storage device as defined in claim 19, wherein said feature parameters are computed for peripheral voxels in a cluster, wherein a peripheral has no voxels sliding into it.

23. A program storage device as defined in claim 19, wherein said feature parameters are computed for surface voxels, wherein surface voxels are identified based on their toboggan potential.

24. A program storage device as defined in claim 19, wherein computing feature parameters includes computing statistical parameters, including one or more of a maximum, minimum, mean and standard derivation of a direct distance sliding distance and distance ratio of each voxel in a selected toboggan cluster.

25. A program storage device as defined in claim 19, wherein computing feature parameters includes computing a volume, surface area, major and minor axes, eigenvalues and eigenvectors, sphericity and eccentricity for a selected toboggan cluster.

26. A program storage device as defined in claim 19, further comprising partitioning voxels in a toboggan cluster into layers and calculating feature parameters for each layer.

27. A program storage device as defined in claim 26, wherein said feature parameters include sphericity, eccentricity and surface isotropy.

28. A program storage device as defined in claim 19, wherein said toboggan potential is a distance map.

* * * * *